(12) United States Patent
Joy et al.

(10) Patent No.: US 10,775,647 B2
(45) Date of Patent: Sep. 15, 2020

(54) SYSTEMS AND METHODS FOR OBTAINING EYEWEAR INFORMATION

(71) Applicant: Fuel 3D Technologies Limited, Oxford (GB)

(72) Inventors: Thomas William Joy, Oxford (GB); Andrew Henry John Larkins, Newbury (GB)

(73) Assignee: FUEL 3D TECHNOLOGIES LIMITED (GB)

( * ) Notice: Subject to any disclaimer, the term of this patent is extended or adjusted under 35 U.S.C. 154(b) by 0 days.

(21) Appl. No.: 16/473,928

(22) PCT Filed: Jan. 30, 2018

(86) PCT No.: PCT/GB2018/050251
§ 371 (c)(1),
(2) Date: Jun. 26, 2019

(87) PCT Pub. No.: WO2018/154271
PCT Pub. Date: Aug. 30, 2018

(65) Prior Publication Data
US 2019/0369418 A1    Dec. 5, 2019

(30) Foreign Application Priority Data
Feb. 22, 2017    (GB) .................................. 1702872.1

(51) Int. Cl.
*G02C 13/00* (2006.01)
*G06T 7/73* (2017.01)
(Continued)

(52) U.S. Cl.
CPC ............ *G02C 13/005* (2013.01); *G06T 7/593* (2017.01); *G06T 7/73* (2017.01); *G06T 17/00* (2013.01);
(Continued)

(58) Field of Classification Search
None
See application file for complete search history.

(56) References Cited

U.S. PATENT DOCUMENTS 6,944,327 B1 *   9/2005  Soatto ................. G02C 13/003
                                                351/159.75
10,564,446 B2 *  2/2020  Nieuwenhuis ......... G02C 7/028
(Continued)

FOREIGN PATENT DOCUMENTS

DE   102005003699 A1   7/2006
DE   102009004383 A1   7/2009
(Continued)

OTHER PUBLICATIONS

GB 1702872.1 priority search report dated Aug. 4, 2017.
(Continued)

*Primary Examiner* — Jeffrey J Chow

(57) ABSTRACT

An imaging system captures one or more images at a time when a subject is comfortably wearing a pair of glasses with dummy lenses. The subject's face is illuminated by energy sources (e.g. visible light sources), and specular reflections ("glints") from the dummy lenses used to measure the locations the dummy lens(es). This provides information about how the comfortable positions for glasses on the subject's face, which can be used to design and fabricate personalized glasses.

20 Claims, 6 Drawing Sheets

(51) Int. Cl.
*G06T 7/593* (2017.01)
*G06T 17/00* (2006.01)

(52) U.S. Cl.
CPC ............... *G06T 2207/10012* (2013.01); *G06T 2207/30201* (2013.01)

(56) References Cited

U.S. PATENT DOCUMENTS

| | | |
|---|---|---|
| 2003/0123026 A1 | 7/2003 | Abitbol |
| 2009/0080036 A1 | 3/2009 | Paterson |
| 2015/0049306 A1 | 2/2015 | Haddadi |
| 2015/0055085 A1 | 2/2015 | Fonte |
| 2015/0127132 A1 | 5/2015 | Nyong |
| 2016/0035133 A1* | 2/2016 | Ye .................. G06T 19/006 345/419 |
| 2016/0042221 A1 | 2/2016 | Mei |
| 2016/0210497 A1 | 7/2016 | Rougeaux |
| 2016/0261850 A1 | 9/2016 | Debevec |
| 2016/0299360 A1 | 10/2016 | Fonte |

FOREIGN PATENT DOCUMENTS

| | | |
|---|---|---|
| GB | 2544460 A | 5/2017 |
| WO | 2007062478 A1 | 6/2007 |
| WO | 2009122200 A1 | 10/2009 |
| WO | 2015027289 A1 | 3/2015 |
| WO | 2016176630 A1 | 11/2016 |
| WO | 2016195488 A1 | 12/2016 |

OTHER PUBLICATIONS

International Search Report for PCT/GB2018/050251 dated Apr. 18, 2018.

D'Angelo, et al. "Image-based 3D surface reconstruction by combination of photometric, geometric, and real-aperture methods", ISPRS Journal of Photogrammetry and Remote Sensing, Amsterdam, Elsevier, vol. 63, No. 3, May 1, 2008.

Huang, et al. "Robust feature extraction for non-contact gaze tracking with eyeglasses", Chinese Journal of Electronics, vol. 22, No. 2, Apr. 1, 2013.

* cited by examiner

SYSTEMS AND METHODS FOR OBTAINING EYEWEAR INFORMATION

CROSS-REFERENCE TO RELATED APPLICATION

This application is the 35 U.S.C. § 371 national stage application of PCT Application No. PCT/GB2018/050251, filed Jan. 30, 2018, where the PCT claims priority to and the benefit of, GB Patent Application No. 1702872.1, filed Feb. 22, 2017, both of which are herein incorporated by reference in their entireties.

SUMMARY OF THE INVENTION

The present invention relates to systems and methods for obtaining data describing how a subject wears an item of eyewear. The data can be used for the selection, design and production of eyewear item, to be used in proximity with the subject's face.

BACKGROUND OF THE INVENTION

A conventional process for providing a subject with eyewear such as glasses (a term which is used here to include both vision correction glasses (spectacles) and sunglasses, or even a headset for virtual reality (VR) or augmented reality (AR)) involves the subject trying on series of dummy frames, and examining his or her reflection in a mirror. Once a frame style has been selected, an optician conventionally makes a number of manual measurements of the subject's face, to obtain distance parameters of the subject's face, which are used to provide a bespoke frame including lenses. In the case of vision correction glasses, the lenses are chosen to have respective refractive power according to the visual deficiencies of the subject's respective eyes.

The measurement process is subject to various errors. For example, it is difficult to measure the distances of the eye to various portions of the lenses, which may be highly disadvantageous for glasses which perform visual correction. It has been estimated that a 2 mm variation of the spacing of the eye and the lens can result in a 10% difference in the resulting field of vision. Additional problems are that the modification of the frame changes the position of the optical centre of the lens in the up/down and left/right directions (relative to the face of the subject) which may also have undesirable optical effects.

SUMMARY OF THE INVENTION

The present invention aims to provide new and useful methods and systems for obtaining information characterizing how a subject wears eyewear.

It also aims to provide new and useful methods and systems for using the eye models for the selection, design and/or production of eyewear items for placement in proximity to the subject's face. The item of eyewear typically includes refractive lenses for vision correction.

In general terms, the invention proposes that at a time when a subject is comfortably wearing a first item of eyewear with one or more eyepieces, such as a first pair of glasses with dummy lenses, the subject's face is illuminated by energy sources (e.g. visible light sources), and images of the subject's face are captured. The images are used to generate a three-dimensional model of a portion of the skin of the subject's face (a "skin model"). Additionally, specular reflections ("glints") from respective eyepiece(s) of the first item of eyewear are used to measure the positions of the eyepiece(s), and generate a model of the position of the first item of eyewear. Combining the skin model and the model of the position of the first item of eyewear, a numerical face model is formed indicating the position of the first item of eyewear on the subject's face.

The numerical face model may be used during the selection and/or creation of a second item of eyewear (e.g. a personalized set of glasses), by taking into account the position(s) at which the subject wore the first item of eyewear. Information derived about the eyewear position(s) where the first item of eyewear was worn can be used to predict where the personalized glasses will be worn, e.g. with the nose-rest of the second item of eyewear touching the same portion(s) of the subject's skin. For example, the position in which the first item of eyewear was worn provides an indication of typical distance between the eyes and the lenses of the personalized glasses when the personalized glasses are worn. This enables the refractive power of the lenses of the personalized set of glasses to be selected taking into account the expected distance between the eye and the lens when the personalized glasses are worn.

The specular reflections which are used to obtain the positions of the eyepieces of the first item of eyewear may be from the front and/or rear surface of the eyepieces.

To form the model of the position of the first item of eyewear, the modelling process may employ a pre-existing numerical eyewear model of the shape of the first item of eyewear.

The measurement process described above is preferably carried out successively when the first item of eyewear is located at more than one position on the subject's face for which the subject finds the first item of eyewear comfortable (referred to here as an "eyewear position"). For example, many subjects tend to wear eyewear in two different eyewear positions. In one eyewear position the center of the bridge between the lenses is touching the subject's skin. In a second eyewear position, the bridge of the glasses is further forward, resting on the bridge of the subject's nose. The second eyewear position may be used, for example when the subject is looking at something beneath the subject's head.

Optionally, a respective skin model may be formed for each of a plurality of eyewear positions, and these skin models are registered together to put them into a common frame of reference (e.g. the frame of reference of a first one of the eyewear positions). The numerical face model may then be produced in a form which includes a skin portion (which may be the skin model for one of the eyewear positions) and a plurality of portions indicating the locations of the first item of eyewear in respective ones of the eyewear positions. The process of registering the skin models together may be performed, for example, by matching landmarks in the skin models (e.g. the tip of the subject's nose, or an end of any eyebrow of the subject).

The estimation process typically takes into account the angle at which the glasses are inclined to the vertical. This may be entirely obtained from the reflections from the lenses of the glasses. However, in principle, the information about reflections may be supplemented with other information, such as data generated by a sensor element moving with the first item of eyewear, such as an accelerometer mounted on the first item of eyewear.

Note that the information about the relative positions of the subject's eye(s) and the first item of eyewear may be obtained using the invention without the first item of eyewear containing special markers, or tags dangling from the first item of eyewear to indicate the vertical direction.

Typical dummy glasses used in opticians do not include an anti-reflective coating. This is advantageous for applications of the present invention, since it relies on reflections from the eyepieces of the first item of eyewear.

Conversely, the lenses of dummy glasses are often zero-power, being either near-planar or more usually being convex on the surface away from the subject and having a compensative concave inner surface. Typically each surface may be a 6 Diopter surface, with a radius of curvature of approximately 85 mm. This compares with the 12 mm radius of curvature of a typical eyeball. Therefore the dummy glasses tend to produce wider reflective glints than the glints due to specular reflections from the subject's eyes. For that reason, it is preferable if the energy which is reflected by the first item of eyewear is generated by energy sources with a small angular extent around the subject's head, such as an energy source which subtends an angle in at least one plane including the centre of the subject's eye, of no more than 1 degree, no more than half a degree, or even less. Such a light source may be produced by a very small light-generating element. The energy source may be an LED, or a display such as an LCD or OLED display, and/or an energy source which transmits the energy to the first item of eyewear through a small aperture.

The imaging system may employ any imaging technique (s) for forming the skin model, such as stereoscopy (discussed below). laser triangulation, time or flight measurement, phase structured fringe pattern imaging and/or photometry (the science of measuring the brightness of light; also discussed below).

In the case of photometry, the imaging system comprises at least one directional energy source (e.g. a light source such as a visible light source) for illuminating the face (preferably successively) in at least three directions. In this case, the skin model may be formed using photometry assuming that the skin exhibits Lambertian reflection in which the reflected radiation is isotropic with an intensity according to Lambert's cosine law (an intensity directly proportional to the cosine of the angle between the direction of the incident light and the surface normal). Recently, great progress has been made in imaging three-dimensional surfaces which exhibit Lambertian reflective properties by means of photometry. WO 2009/122200 proposes a system in which a three-dimensional model of a 3-D object is produced in which large-scale features are imaged by stereoscopic imaging (that is, by comparing the respective positions of landmarks in multiple images of a subject captured from respective directions), and fine detail is produced by photometric imaging. A system of that type may be employed also in the present invention.

The numerical face model may further include at least one eye portion. Each eye portion of the numerical face model is an eye model indicating the position, relative to the skin model and the dummy lenses, of one of the subject's eyes (such as the position of the centre of rotation of the subject's eyes), and/or the size of that one of the subject's eyes.

The eye model(s) may be derived using identified specular reflections in the images from the surface of the subject's eye(s). They may be produced by a process including fitting data obtained from the captured images to numerical parameters of a pre-existing numerical eye model. The eye model may include a sclera portion representing the sclera, and a cornea portion representing the cornea. The sclera portion may be portion of the surface of a first sphere centred on the centre of rotation of the eye, and the cornea portion may a portion of the surface of a second sphere having a smaller radius of curvature than the first sphere. The centers of the two spheres are spaced apart, and the line joining them intersects with the center of the cornea portion of the model, at a position which may be taken as the center of the pupil.

Optionally, the process of generating the eye portion of the numerical face model compensates for refraction of light rays due to passage through the first item of eyewear to/from the eye.

As noted above, the numerical face model may be employed in an automatic process for designing a personalized second item of eyewear for use in proximity with the subject's face (the term "proximity" is used here to include also the possibility that the object is in contact with the face). The term "designing" is used here to include a process of selecting from a plurality of pre-defined designs for eyewear items, and/or modifying one of more parameters (typically distance parameters) of a pre-defined design of eyewear items.

The second item of eyewear typically includes at least one lens for each eye, and a frame for supporting the lens(es) in relation to the subject's face. For example, the second item of eyewear may be a set of glasses, of a type having any one of more of the following functions: vision correction, eye protection (including goggles or sunglasses), cosmetic reasons and/or AR or VR goggles.

At least one lens may be a refractive lens for vision correction. The shape of the lens may be selected based on the centre of rotation of the corresponding eye (centre of eye rotation, CER), optionally including selecting the refractive power of one or more portions of the lens. This has a significant effect on the field of vision of the subject. For example, the refractive power of different portions of the lens may be adjusted to compensate for the different distances of those portions of the lens from the CER. Alternatively or additionally, the overall shape of the lens may be varied to reduce the distance of different portions of the lens from the CER.

This design process may assume that the glasses are positioned on the face of the subject in contact with one or more portions of the skin model portion of the numerical face model.

The design of the eyewear may alternatively or additionally include varying one or more dimensions of the frame based on the numerical face model. For this purpose the design process may employ a template of an item of eyewear defined by one or more parameters, and vary those parameters according to the numerical face model. For example the modification of the frame may be to select a distance between a certain portion of the lens (e.g. the optical centre of the lens) in accordance with the spacing of the CERs of the subject's eyes according to the two eye models, and/or to place the certain portion of the lenses at a desired distance from the CERs of the respective eyes.

Optionally, the selection of the respective refractive power of different portion(s) of the lens(es) and the selection of the dimensions of the frame may be conducted together, to produce a design of the item of eyewear which may be optimal in terms of both vision correction and comfort.

At least one component of the second item of eyewear (e.g. the arms of the glasses, or the nose pads, or the lenses) may be fabricated (e.g. by molding or 3D printing) according to the designed eyewear. This would provide the item of personalized eyewear in a comfortable form, and with high performance.

Note that it is not essential that the steps of designing or constructing the second item eyewear are performed by the same individuals who carry out the formation of the numerical face model. For example, a first organization may produce a numerical face model, which is transmitted to a second organization to produce a second item of eyewear consistent with the numerical face model.

As mentioned above, in the case that the skin model is obtained using photometry, the face of the subject is preferably illuminated successively in individual ones of at least three directions. If this is done, the energy sources may emit light of the same frequency spectrum (e.g. if the energy is visible light, the directional light sources may each emit white light and the captured images may be color images). However, in principle, the subject could alternatively be illuminated in at least three directions by energy sources which emit energy with different respective frequency spectra (e.g. in the case of visible light, the directional light sources may respectively emit red, white and blue light). In this case, the directional energy sources could be activated simultaneously, if the energy sensors are able to distinguish the energy spectra. For example, the energy sensors might be adapted to record received red, green and blue light separately. That is, the red, green and blue light channels of the captured images would be captured simultaneously, and would respectively constitute the images in which the object is illuminated in a single direction. However, this second possibility is not preferred, because coloration of the object may lead to incorrect photometric imaging.

Various forms of directional energy source may be used in embodiments of the invention. For example, a standard photographic flash, a high brightness LED cluster, or Xenon flash bulb or a 'ring flash'. It will be appreciated that the energy need not be in the visible light spectrum.

In principle, there could be only one directional energy source which moves so as to successively illuminate the subject from successive directions.

However, more typically, at least three energy sources are provided. It would be possible for these sources to be provided as at least three energy outlets from an illumination system in which there are fewer than three elements which generate the energy. For example, there could be a single energy generation unit (light generating unit) and a switching unit which successively transmits energy generated by the single energy generation unit to respective input ends of at least three energy transmission channels (e.g. optical fibers). The energy would be output at the other ends of the energy transmission channels, which would be at three respective spatially separately locations. Thus the output ends of the energy transmission channels would constitute respective energy sources. The light would propagate from the energy sources in different respective directions.

Where visible-light directional energy is applied, then the energy sensors may be two or more standard digital cameras, or video cameras, or CMOS sensors and lenses appropriately mounted. In the case of other types of directional energy, sensors appropriate for the directional energy used are adopted. A discrete sensor may be placed at each viewpoint, or in another alternative a single sensor may be located behind a split lens or in combination with a mirror arrangement.

The energy sources and viewpoints preferably have a known positional relationship, which is typically fixed. The energy sensor(s) and energy sources may be incorporated in a portable, hand-held instrument. Alternatively, particularly in the application described below involving eyewear, the energy sensor(s) and energy sources may be incorporated in an apparatus which is mounted in a building, e.g. at the premises of an optician or retailer of eyewear.

Although at least three directions of illumination are required for photometric imaging, the number of illumination directions may be higher than this. The energy sources may be operated to produce a substantially constant total intensity over a certain time period (e.g. by firing them in close succession), which has the advantage that the subject is less likely to blink.

Alternatively, the energy sources may be controlled to be turned on by processor (a term which is used here in a very general sense to include for example, a field-programmable gate array (FGPA) or other circuitry) which also controls the timing of the image capture devices. For example, the processor could control the a different subset of the energy sources to produce light in respective successive time periods, and for each of the image capture device to capture a respective image during these periods. This has the advantage that the processor would be able to determine easily which of the energy sources was the cause of each specular reflection.

Specular reflections may preserve polarization in the incident light, while Lambertian reflections remove it. To make use of this fact, some or all of the light sources may be provided with a filter to generate light with a predefined linear polarization direction, and some or all of the image capture devices may be provided with a filter to remove incident light which is polarized in the same direction (thus emphasizing Lambertian reflections) or the transverse direction (thus emphasizing specular reflections).

One possibility, if the energy sources include one or more energy sources of relatively high intensity and one or energy sources which are of relatively lower intensity, is to provide linear polarization for the one of more of the energy sources of high intensity, and random polarization for the one or more energy sources which are of relatively lower intensity. For example, the specular reflections may only be captured using only the high intensity energy sources, in which case (e.g. only) those energy sources would be provided with a polarizer producing a polarization which is parallel to a polarization of the energy sensors used to observe the specular reflections.

One or more of the energy sources may be configured to generate light in the infrared (IR) spectrum (wavelengths from 700 nm to 1 mm) or part of the near infrared spectrum (wavelengths from 700 nm to 1100 nm). These wavelength ranges have several advantages. Since the subject is substantially not sensitive to IR or near-IR radiation, it can be used in situations in which it is not desirable for the subject to react to the imaging process. For example, IR or near-IR radiation would not cause the subject to blink. Also, IR and near-IR radiation may be used in applications as discussed below in which the subject is presented with other images during the imaging process.

BRIEF DESCRIPTION OF THE DRAWINGS

An embodiment of the invention will now be described for the sake of example only with reference to the following figures in which.

DETAILED DESCRIPTION OF THE EMBODIMENTS

Figure 1A:
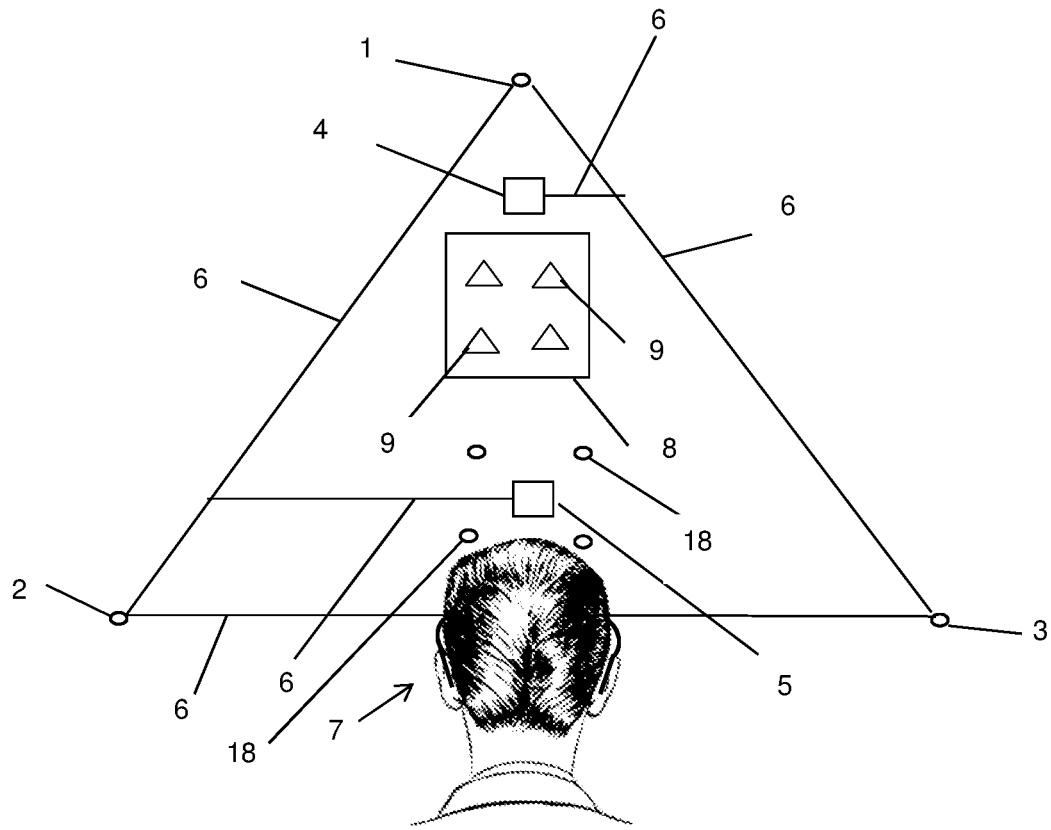
FIG. 1 is composed of FIG. 1(a) which is a schematic view of an imaging assembly for use in an embodiment of the present invention, and FIG. 1(b) which is a schematic view of a portion of the imaging assembly of FIG. 1(a) in a transverse direction to that of FIG. 1(a)
Figure 1B:
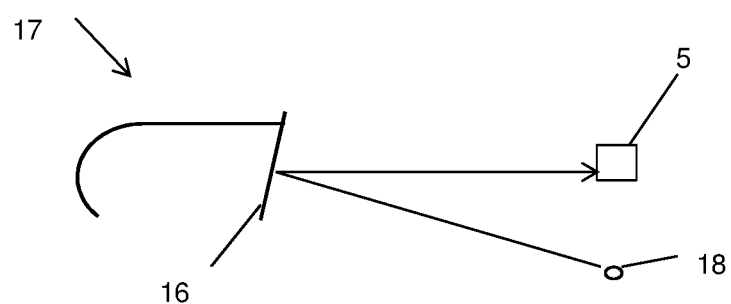

Referring firstly to FIG. 1(a), an imaging assembly is shown which is a portion of an embodiment of the invention for imaging a subject 7 wearing a pair of dummy glasses 17. FIG. 1(b) shows schematically a side view (that is, viewed in the direction from right to left in FIG. 1(a)) of the dummy glasses 17 and some elements of the imaging assembly when the subject 7 is in the position shown in FIG. 1(a).

The imaging assembly includes directional energy sources 1, 2, 3. It further includes energy sensors 4, 5 in form of image capturing devices (cameras). The energy sensors 4, 5 and the energy sources 1, 2, 3 are fixedly mounted to each other by struts 6. The exact form of the mechanical connection between the energy sources 1, 2, 3 and the energy sensors 4, 5 is different in other forms of the invention, but it is preferable if it maintains the energy sources 1, 2, 3 and the energy sensors 4, 5 not only at fixed distances from each other but at fixed relative orientations. The positional relationship between the energy sources 1, 2, 3 and the energy sensors 4, 5 is pre-known. In addition to the assembly shown in FIG. 1(a), the embodiment includes a processor which is in electronic communication with the energy sources 1, 2, 3 and image capturing devices 4, 5. This is described below in detail with reference to FIG. 7.

The energy sources 1, 2, 3 are each adapted to generate directional electromagnetic radiation, such as visible light or infra-red radiation. The energy sources 1, 2, 3 are all controlled by the processor. The output of the image capturing devices 4, 5 is transmitted to the processor.

Each of the image capturing devices 4, 5 is arranged to capture an image of the face of a subject 7 positioned in both the respective fields of view of the image capturing devices 4, 5. The subject 7 is wearing a first item of eyewear, which is a set of dummy glasses 17 having a frame and eyepieces 16 supported by the frame. The subject is asked to position the dummy glasses 17 at a comfortable position on his or her face, and to place his or her head in an imaging area, where it is well illuminated by the energy sources 1, 2, 3 when they are illuminated.

The image capturing devices 4, 5 are spatially separated, and preferably also arranged with converging fields of view onto the imaging area, so the apparatus is capable of providing two separated viewpoints of the subject 7, so that stereoscopic imaging of the subject 7 is possible. The case of two viewpoints is often referred to as a "stereo pair" of images, although it will be appreciated that in variations of the embodiment more than two spatially-separated image capturing devices may be provided, so that the subject 7 is imaged from more than two viewpoints. This may increase the precision and/or visible range of the apparatus. The words "stereo" and "stereoscopic" as used herein are intend to encompass, in addition to the possibility of the subject being imaged from two viewpoints, the possibility of the subject being imaged from more than two viewpoints.

Note that the images captured are typically color images, having a separate intensity for each pixel each of three color channels. In this case, the three channels may be treated separately in the process described below (e.g. such that the stereo pair of images also has two channels).

The system may optionally comprise a display device 8 having a plurality of lights 9. The imaging system is operative to illuminate the lights 9 in successive time periods (which are spaced apart), so that the subject, who looks towards each light 9 as it is illuminated, successively changes his or her viewing direction (i.e. the direction in which he or she is looking). Note that in a variation of the embodiment, the subject might simply be asked to shift his or her viewing direction successively, for example to look in successive time periods at a respective ones of a plurality of portions of a static display.

The imaging assembly of FIG. 1(a) further includes four energy sources 18 (in other embodiments, the number of energy sources 18 may be different, as discussed below) which are arranged in the field of view of the subject 7 angularly spaced around the image capturing device 5. The energy sources 18 are at pre-known positions with respect to the image capturing devices 4, 5. The energy sources 18 may be LEDs, and for emitting electromagnetic radiation, such visible light, which causes specular reflections on surfaces of the lenses 16 of the dummy glasses 17 which are included in the images captured by the imaging device 5. All the LEDs 18 may be illuminated at the same time (e.g. continuously).

As depicted schematically in FIG. 1(b), dummy glasses 17 are conventionally formed such that when a subject wears the dummy glasses 17 and looks generally towards the image capturing device 5 in a horizontal direction, the zero-power lenses 16 of the dummy glasses 17 are angled downwardly ("pantoscopic tilt"). For that reason, it may be advantageous for at least one or more of the energy sources 18 to be lower than the camera 5 as perceived by the subject 7, to increase the likelihood that energy transmitted by the energy source 18 reaches the camera 5. It is unlikely that the image capture device 4 will capture any of the specular reflections from the lenses 16, so images captured by the image capture device 4 are preferably not used to determine the position of the lenses 16.

Note that although in FIG. 1(a) the energy sources 1, 2, 3 are shown as separate from the energy sources 18, in other embodiments, there may be an overlap between these two sorts of energy source, such that one or more of the energy sources 1, 2, 3 is positioned so as to generate specular reflections from a lens of the first item of eyewear which can be captured by at least one of the image capturing devices 4, 5.

Figure 2:
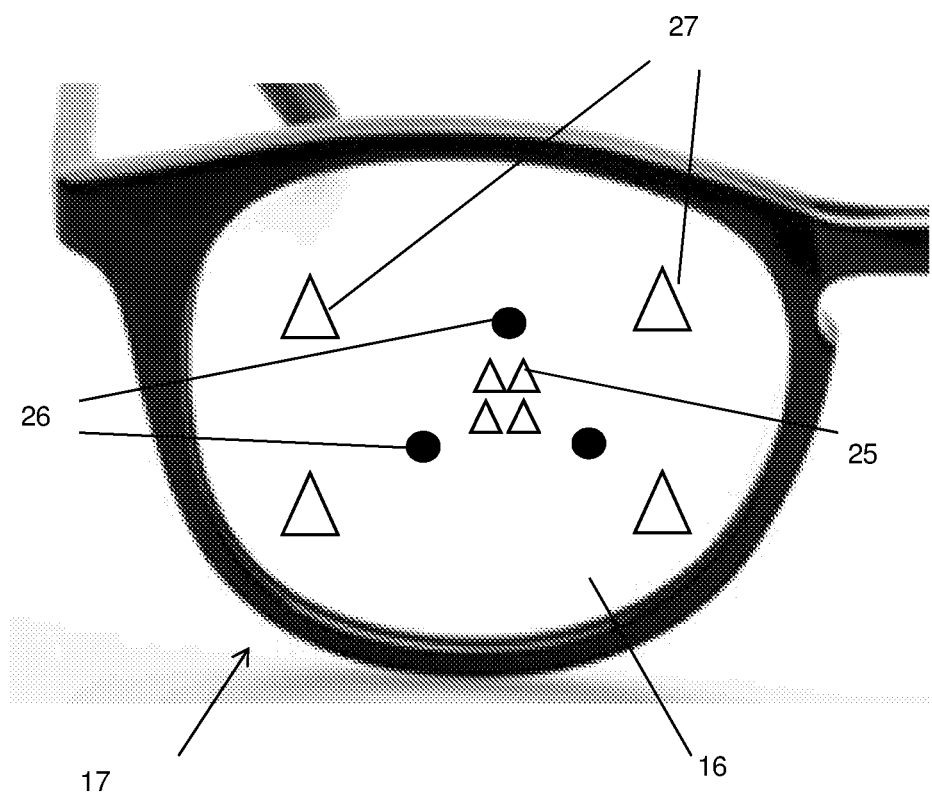
FIG. 2 illustrates specular reflections typically observed in the system of FIG. 1(a)

FIG. 2 illustrates typical specular reflections observed in images captured by the imaging device 5. For simplicity, the head of the subject 7 is omitted in this figure. There are three forms of reflections: specular reflections 25 (illustrated schematically as triangles) from the subject's eye of light generated by the energy sources 18; specular reflections 26 (illustrated schematically as circles) from the eye of the subject 7 due to the energy sources 1, 2, 3; and specular reflections 27 (illustrated schematically as triangles) from the lenses 16 of the dummy glasses 17 of light generated by the energy sources 18.

Suitable image capture devices for use in the invention include the ⅓-Inch CMOS Digital Image Sensor (AR0330) provided by ON Semiconductor of Arizona, US. All the images used for the modelling are preferably captured within a duration of no more than 0.2 s, and more preferably no more than 0.1 s. However, it is possible to envisage embodiments in which the images are captured over a longer duration, such as up to about 1 second or even longer.

Figure 3:
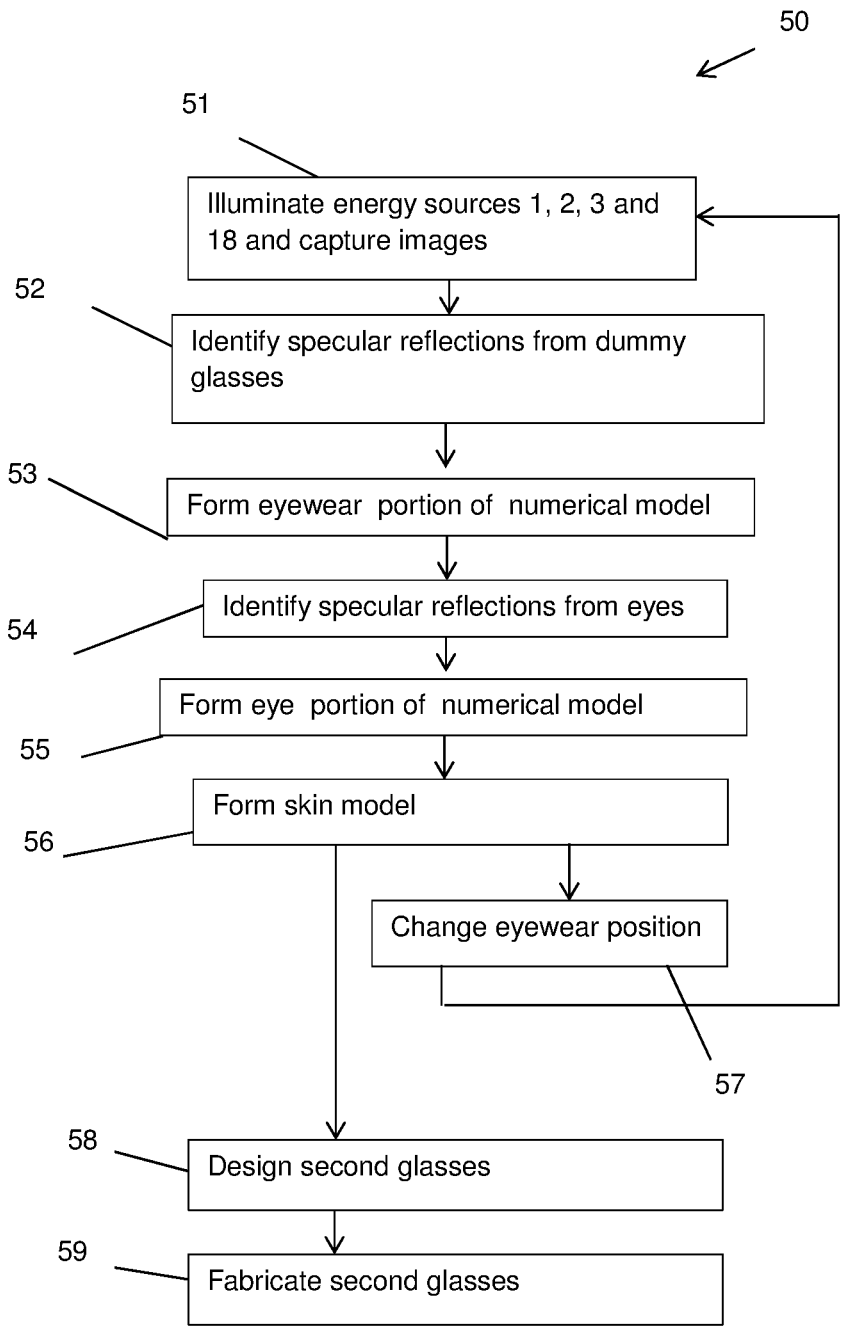
FIG. 3 is a flow diagram of a method performed by an embodiment of the invention

A method 50 according to the invention is illustrated in FIG. 3. The method 50 may be performed at a time when one of the lights 9 in display 8 is illuminated. The method produces a 3-dimensional numerical face model comprising an eyewear portion which is a model of the dummy glasses 17, a skin model portion, and optionally a respective eye portion for each of the subject's eyes.

In step 51 the energy sources 1, 2, 3 are illuminated (e.g. successively). Images are captured using each of the image capturing devices 4, 5 whenever respective ones of the energy sources 1, 2, 3 are illuminated. The energy sources 18 may all be illuminated (e.g. continuously) during this process. Step 51 is preferably performed in a short time period (e.g. less than 0.2, or even less than 0.1 s), so that the subject's face and eyes do not significantly move during this period. Optionally, step 51 may include capturing an image at a time when all the energy sources 1, 2, 3, 18 are illuminated, since this image will have a maximum number of specular reflections.

In step 52, specular reflections 27 from the eyepieces of the dummy glasses are identified in the images. Since the approximate position of the eyepieces of the dummy glasses is known in advance from the fact that the subject's head is in the imaging area, it is typically not difficult to identify which specular reflections 27 are due to the eyepieces. This is because the radius of curvature of the surfaces of the lenses 16 is much higher than the radius of curvature of the subject's eyeballs, so the reflections 27 are much further from the optical axis of the eye than the reflections 25, 26. We have found that typically the reflections 27 are about eight times as far from the optical axis of the eye as the reflections 25. Furthermore, since there may be specular reflections on both surfaces of the lenses of the dummy glasses, the specular reflections in each image may occur in pairs, especially if the lens is thick, and this fact may be used to identify them.

There is no risk of the subject significantly moving his or her head during the capture of a single image, so using a single image to estimate the position of the lenses 16 is preferable to using multiple images which were captured in step 51 at different times.

Note that in typical dummy glasses, the lenses are zero-power with a front surface curvature equivalent to 6 diopter, which may be lead to poorly defined specular reflections 27 if the energy sources 18 are wide. Accordingly, it is preferable if the energy sources 18 have a small angular extent around the subject's head, such as an energy source which subtends an angle in at least one plane including the subject's eye, of no more than 1 degree, no more than half a degree, or even less. For this purpose the energy sources 18 may be realized as a small light-generating elements, such as an LED, and/or as an energy source which transmits the light to the first glasses through a small aperture (e.g. a pinhole). If an LED is used as the energy source 18, it may be a 3 mm diameter LED or similar. If such an LED were positioned 500 mm from the subject's eye it would subtend an angle of about 0.35 degrees. Alternatively, even smaller LEDs may used, such as near point-source ones which have an active area less than 200 μm wide. LEDS with an emitting area of 160 μm are available from Kyosemi Corporation of Kyoto, Japan, under product number ked160raxh.

In certain embodiments of the invention, the number of light sources 18 may be higher than four, such as at least 5, or even at least 10. This is to maximize the chance that EM radiation generated by some of the energy sources 18 is reflected into the camera 5 irrespective of the tilting of the lens 16.

In step 53, the eyewear portion of the numerical face model is formed. This may include fitting a pre-existing eyewear model in the shape of the dummy glasses to the specular reflections. Thus, the position of the dummy glasses in the pre-known reference frame of the energy sources 18 and image capturing devices 4, 5 is obtained.

In step 54, the specular reflections in the images due to reflections from the subject's eyes are identified. Again, the position of the subject's eyes is known approximately in advance, so this identification process is straightforward. In any case, since it may be assumed that all specular reflections in the image are due to the subject's eyes or the dummy glasses, step 54 can be performed by finding all specular reflections and removing from them the specular reflections identified in step 52.

In step 55, the specular reflections are used to form, for each of the subject's eyes, the respective eye portion of the numerical face model.

Figure 4:
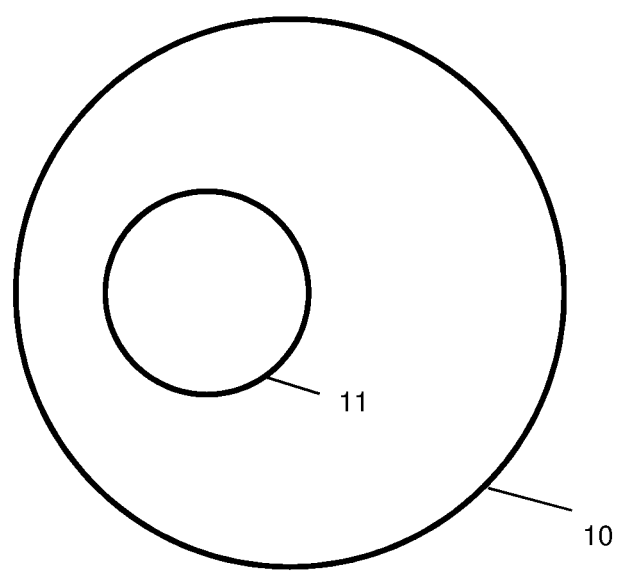
FIG. 4 shows an eye model for use in the embodiment.

Step 55 may be performed by setting numerical parameters of a pre-existing numerical eye model. A simple form for the pre-existing eye model which can be used is shown in FIG. 4. It consists of a sclera portion 10 representing the sclera (the outer white part of the eye), and a cornea portion 11 intersecting with the sclera portion 10. The sclera portion 10 may be frusto-spherical (i.e. a sphere minus a segment of the sphere which is to one side of a plane which intersects with the sphere). However, since only the front of the eyeball can cause reflections, the sclera portion 10 of the pre-existing eye model may omit portions of the spherical surface which are angularly spaced from the cornea portion about the centre of the sphere by more than a predetermined angle. The centre of the sphere of which the sclera portion 10 forms a part is a centre of rotation (CER) of the eye.

The cornea portion 11 of the model is a segment of a sphere with a smaller radius of curvature than then sclera portion 10; the cornea portion 11 too is frusto-spherical, being less than half of the sphere having smaller radius of curvature. The cornea portion 11 is provided upstanding from the outer surface of the sclera portion 10 of the model, and the line of intersection between the sclera portion 10 and the cornea portion 11 is a circle. The center of the cornea portion 11 is taken as the center of the pupil. It lies on the line which passes through the center of the sphere used to define the sclera portion 10, and the center of the sphere used to define the cornea portion 11.

The pre-existing eye model of FIG. 4 is defined by 8 parameters (numerical values): the coordinates of the CER in a 3-D space defined in relation to the position of the imaging assembly (3 numerical values); the radius of the sclera portion 10; the direction of the gaze of the subject (2 numerical values defining the orientation of the eye); the radius of curvature of the cornea portion 11; and the degree to which the cornea portion 11 stands up from the sclera portion 10. These values are estimated from the specular reflections to form the eye portion of the numerical face model. Optionally, additional knowledge may be used in this process. For example, the eyeballs of individuals (especially adult individuals) tend to be of about the same size, and this knowledge may be used to pre-set certain dimensions of the pre-existing eye model. Furthermore, on the assumption that subject is looking at the light 9, the orientation of the eye is pre-known.

Suppose that the cameras 4, 5 captured respective images in step 51 at a time when each of the energy sources 1, 2, 3 and 18 is transmitting energy. The electromagnetic radiation produced by each energy source 1, 2, 3, 18 is reflected by each of the eyes of the subject in a specular reflection to give corresponding glints 25, 26 in the images. The positions of these glints are taken as data values. Using the data values, it is possible for the 8 parameters of the pre-existing eye model to be estimated ("fitted" to the data values). This can include computationally searching for values of the desired parameters of the pre-existing eye model which are most closely consistent with the observed positions of the specular reflections within the images.

The processor expresses the eye model in a coordinate system defined relative to the pre-known fixed relative positions of the image capture devices 4, 5 and the energy sources 1, 2, 3, 18. Thus, the eyewear portion of the numerical face model, and the eye portions of the numerical face model are in the same coordinate system.

Figure 5:
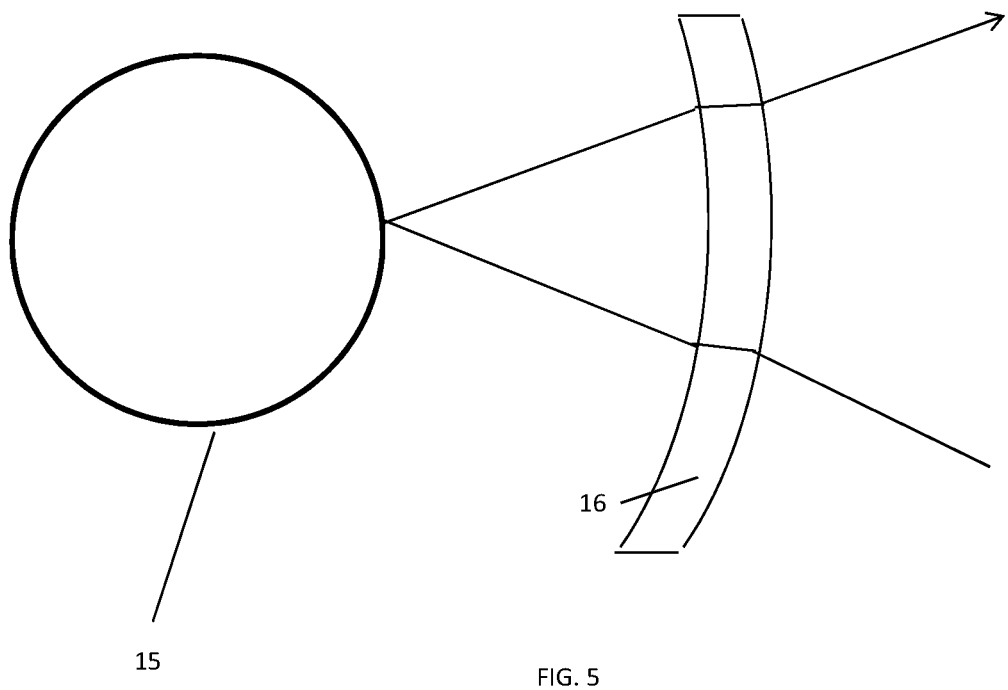
FIG. 5 illustrates refraction of a light ray as it passes through a zero-power lens and is reflected from the surface of an eye.

Note that for certain dummy glasses, as depicted in FIG. 5, the light rays which are reflected by the eye 15 are refracted significantly by the lens 16 of the dummy glasses, in both transitions through the lens 16. Since the eyewear portion of the numerical face model is available when steps 54 and 55 is carried out, the effects of this refraction may be compensated for as part of one of these steps.

In step 56, a skin model of a portion of the subject's skin is formed. The skin of the subject 7 will typically reflect electromagnetic radiation generated by the energy sources 1, 2, 3 by a Lambertian reflection, so the skin portion of the subject's face may be imaged in the manner described in detail in WO 2009/122200, to form the skin model. The skin model may optionally also include a portion of the subject's hair, although since a subject's hair may move relative to the subject's face as the subject's head moves preferably the landmarks in the skin model discussed below are landmarks of the subject's skin rather than the subject's hair.

In brief, two acquisition techniques for acquiring 3D information are used to construct the skin model. One is photometric reconstruction, in which surface orientation is calculated from the observed variation in reflected energy against the known angle of incidence of the directional source. This provides a relatively high-resolution surface normal map alongside a map of relative surface reflectance (or illumination-free colour), which may be integrated to provide depth, or range, information which specifies the 3D shape of the object surface. Inherent to this method of acquisition is output of good high-frequency detail, but there is also the introduction of low-frequency drift, or curvature, rather than absolute metric geometry because of the nature of the noise present in the imaging process. The other technique of acquisition is passive stereoscopic reconstruction, which calculates surface depth based on optical triangulation. This is based around known principles of optical parallax. This technique generally provides good unbiased low-frequency information (the coarse underlying shape of the surface of the object), but is noisy or lacks high frequency detail. Thus the two methods can be seen to be complementary. The skin model may be formed by forming an initial model of the shape of the skin using stereoscopic reconstruction, and then refining the initial model using the photometric data to form the skin model.

The photometric reconstruction requires an approximating model of the surface material reflectivity properties. In the general case this may be modelled (at a single point on the surface) by the Bidirectional Reflectance Distribution Function (BRDF). A simplified model is typically used in order to render the problem tractable. One example is the Lambertian Cosine Law model. In this simple model the intensity of the surface as observed by the camera depends only on the quantity of incoming irradiant energy from the energy source and foreshortening effects due to surface geometry on the object. This may be expressed as:

$$I = P\rho L \cdot N \qquad \text{(Eqn 1)}$$

where I represents the intensity observed by the image capture devices 4, 5 at a single point on the object, P the incoming irradiant light energy at that point, N the object-relative surface normal vector, L the normalized object-relative direction of the incoming lighting and $\rho$ the Lambertian reflectivity of the object at that point. Typically, variation in P and L is pre-known from a prior calibration step (e.g. using the localization template 8), or from knowledge of the position of the energy sources 1, 2, 3, and this (plus the knowledge that N is normalized) makes it possible to recover both N and $\rho$ at each pixel. Since there are three degrees of freedom (two for N and one for $\rho$), intensity values/are needed for at least three directions L in order to uniquely determine both N and $\rho$. This is why at least three energy sources 1, 2, 3 are provided.

The stereoscopic reconstruction uses optical triangulation, by geometrically correlating the positions in the images captured by the image capture devices 4, 5 of the respective pixels representing the same point on the face (e.g. a feature such as a nostril or facial mole which can be readily identified on both images). The pair of images is referred to as a "stereo pair". This is done for multiple points on the face to produce the initial model of the surface of the face.

The data obtained by the photometric and stereoscopic reconstructions is fused by treating the stereoscopic reconstruction as a low-resolution skeleton providing a gross-scale shape of the face, and using the photometric data to provide high-frequency geometric detail and material reflectance characteristics.

Many subjects wear glasses in two comfortable eyewear positions on his or her face. In one the glasses are pushed back so that the bridge of the glasses is against the subject's forehead/upper nose. In the second, the bridge is a little forward, resting on the bridge of the subject's nose. Optionally, in step 57 the subject changes the position of the dummy glasses from one of these comfortable eyewear positions to the other. Then steps 51-56 are repeated. The respective skin models formed on the two occasions in which step 56 were performed are registered together to put them into a common frame of reference (e.g. the frame of reference of a first one of the eyewear positions). The process of registering the skin models together may be performed, for example, by matching landmarks in the skin models (e.g. the tip of the subject's nose, or an end of any eyebrow of the subject). A numerical face model is thus created which includes a skin portion (which may be the skin model for one of the eyewear positions), and a plurality of eyewear portions indicating the respective locations of the first item of eyewear in the respective ones of the eyewear positions.

In step 58, the numerical face model is used to select and/or design a second item of eyewear, which is thus a personalized item for the subject. The second item of eyewear may be a pair of glasses (which may be glasses for vision correction, sunglasses or glasses for eye protection, or even a headset for virtual reality (VR) or augmented reality (AR)).

For this purpose, the processor may store in a data-storage device a 3D model of at least part of one or more candidate second items of eyewear. For each candidate second item of eyewear, the processor may form a corresponding second numerical face model indicating how the second item of eyewear is worn on the face. The second numerical face model may comprise the skin portion of the first numerical model, and be generated on the assumption that the second item of eyewear is worn in at least one position corresponding to at least one of the eyewear positions at which the first item of eyewear was worn on the face of the subject on one of the respective occasions when step 51 was carried out. For example, it may be assumed that the second item of eyewear is worn in an eyewear position in which a nose-rest portion of the second item of eyewear is supported on the same position on the nose of the subject as the position at which a nose-rest of the first item of eyewear rested during one of the occasions in which step 51 was carried out.

Figure 6:
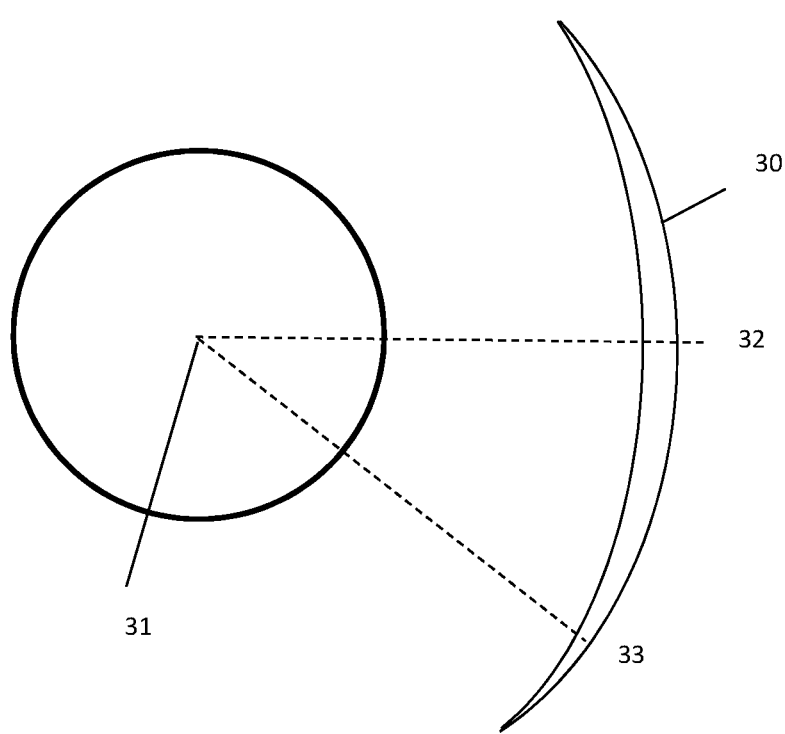
FIG. 6 illustrates the use of an eye model in designing a lens of an item of eyewear.

It may be that the frame of the second item of eyewear is substantially identical to the frame of the dummy glasses. In this case, the design of the second item of eyewear may simply comprise designing the refractive power of the lenses of the second item of eyewear. For example, as illustrated in FIG. 6, the lens 30 of the second item of eyewear includes a portion 32 which is relatively close to the CER 31 of the eye portion of the numerical face model, and a portion 33 which is relatively far from the CER 31. The refractive power of the lens 30 may be controlled to be different in the region 33 from that in the region 32 according to this difference in distances, so that the subject's vision is corrected irrespective of whether the subject is looking towards the portion 32 or the portion 33. This control may also take into account any variation in the refractive power of the lens 30 which is desired to make the lens 30 bi-focal, multi-focal or vari-focal.

Alternatively, the numerical face model may be used in step 58 as part of process for selecting a design for the second item of eyewear from a plurality of the candidate second items of eyewear. For example, the candidate second items of eyewear may be screened using the numerical face model to eliminate any in which the subject's cheek would impact against the second item of eyewear when the second item of eyewear is worn in one of the eyewear positions.

Alternatively or additionally, step 58 may include using the numerical face model to modify at least one dimension of a frame portion of the 3D model of the second item of eyewear. For example, the configuration of a nose-rest component of the object model (which determines the position of a lens relative to the nose) may be modified according to the inter-pupil distance, and/or to ensure that the lenses are positioned at a desired spatial location relative to the subject's eyes when the eyes face in a certain direction and the second item of eyewear is at one of the comfortable positions on the subject's face. Furthermore, if the item of eyewear has arms to contact the subject's ears, the length of the arms may be modified in the eyewear model to make this a comfortable fit. If the face model is accurate to within 250 microns, this will meet or exceed the requirements for well-fitting glasses.

Step 58 may further include obtaining at least one numerical parameter characterizing the fields of view of the subject if the subject wears the second item of eyewear. For example, the numerical value may be the maximum angle of the field of view in a certain plane defined in relation to the second item of eyewear (e.g. a plane including the optical centres of the lenses of the second item of eyewear and normal directions to the front lens surfaces at at least one of the optical centres). The numerical parameter may be compared with a threshold value to ensure it is above a threshold, and if that condition is not met a warning may be generated.

In this way, the numerical face model may be used to aid a process of selecting a second item of eyewear suitable for the subject's face.

In step 59, the system produces at least one component of the second item of eyewear (e.g. the arms and/or the nose-rest component, and/or at least one of the two lenses). If the 3D model of the second item of eyewear was modified, the process may produce the component according to a parameter of the modified model.

Step 59 can be performed for example by three-dimensional printing. Note that if the eyewear is an item such as varifocal glasses, great precision in producing them is essential, and a precision level of the order of the 250 microns, which is possible in preferred embodiments of the invention, may be essential for high technical performance.

The energy sources 1, 2, 3 may be designed and controlled in several ways. First, as mentioned above, it may be advantageous for the processor to control the timing of the operation of the energy sources, for example to ensure that only a selected subset of the energy sources 1, 2, 3 are operating when a certain image is captured, e.g. such that only one of the energy sources is operating when any corresponding image is captured; this is usual for photometry. If the energy sources (at least, those which produce the same level of light intensity) are activated successively with no significant gaps between then during this period the total level of light would be substantially constant; this would minimize the risk of the subject blinking. Optionally, an additional image may be captured with all the light sources firing.

Secondly, the illumination system may employ polarization of the electromagnetic radiation. As described above, the processor forms the second model using Lambertian reflections, and fits the parameters of each eye model using the specular reflections. In fact, however, the skin is not a perfect Lambertian reflector, and an eye is not a perfect specular reflector. To address this, the imaging process may use polarization to help the processor distinguish Lambertian reflection from specular reflection, since Lambertian reflection tends to destroy any polarization in the incident light, whereas specular reflection preserves polarization.

In one possibility, the energy sources 1, 2, 3 would comprise polarization filters (e.g. linear polarization filters), and the image capturing devices 4, 5 would be provided with a respective constant input polarization filter, to preferentially remove electromagnetic radiation polarized in a certain direction. The choice of that direction, relative to the polarization direction of the electromagnetic radiation emitted by the energy sources 1, 2, 3, would determine whether the filter causes the image capturing devices 4, 5 to preferentially capture electromagnetic radiation due to Lambertian reflection, or conversely preferentially capture electromagnetic radiation due to specular reflection. A suitable linear polarizer would be the XP42 polarizer sheet provided by ITOS Gesellschaft für Technische Optik mbH of Mainz, Germany. Note that this polarizer sheet does not work for IR light (for example, with wavelength 850 nm), so should not be used if that choice is made for the energy sources.

A further possibility would be for the imaging apparatus to include a first set of image capturing devices for capturing the Lambertian reflections, and a second set of image capturing devices for capturing the specular reflections. The first image capturing devices would be provided with a filter for preferentially removing light polarized in the direction parallel to the polarization direction of the electromagnetic radiation before the reflection and/or the second image capturing devices would be provided with a filter for preferentially removing light polarized in the direction transverse to the polarization direction of the electromagnetic radiation before the reflection. The processor would use the images generated by the first set of image capturing devices to form the second model, and the images generated by the second set of image capturing devices for fit the parameters of the eye model.

Alternatively, each of the image capturing devices 4, 5 may be provided with a respective electronically-controllable filter, which filters light propagating towards the image capturing device to preferentially remove electromagnetic radiation polarized in a certain direction. The image capturing device may capture two images at times when a given one of the energy sources 1, 2, 3 is illuminated: one image at a time when the filter is active to remove the electromagnetic radiation with the certain polarization, and one when the filter is not active. The relative proportions of Lambertian reflection and specular reflection in the two images will differ, so that by comparing the two images, the processor is able to distinguish the Lambertian reflection from the specular reflection, so that only light intensity due to the appropriate form of reflection is used in form the second model and/or the eye model.

Thirdly, some of all of the energy sources 1, 2, 3 may generate IR or near-IR light. This is particularly desirable if it is not desirable for the subject to see the directional energy (e.g. because it is not desirable to make him or her blink; or because the embodiment is used at a time when the subject is looking at other things).

Figure 7:
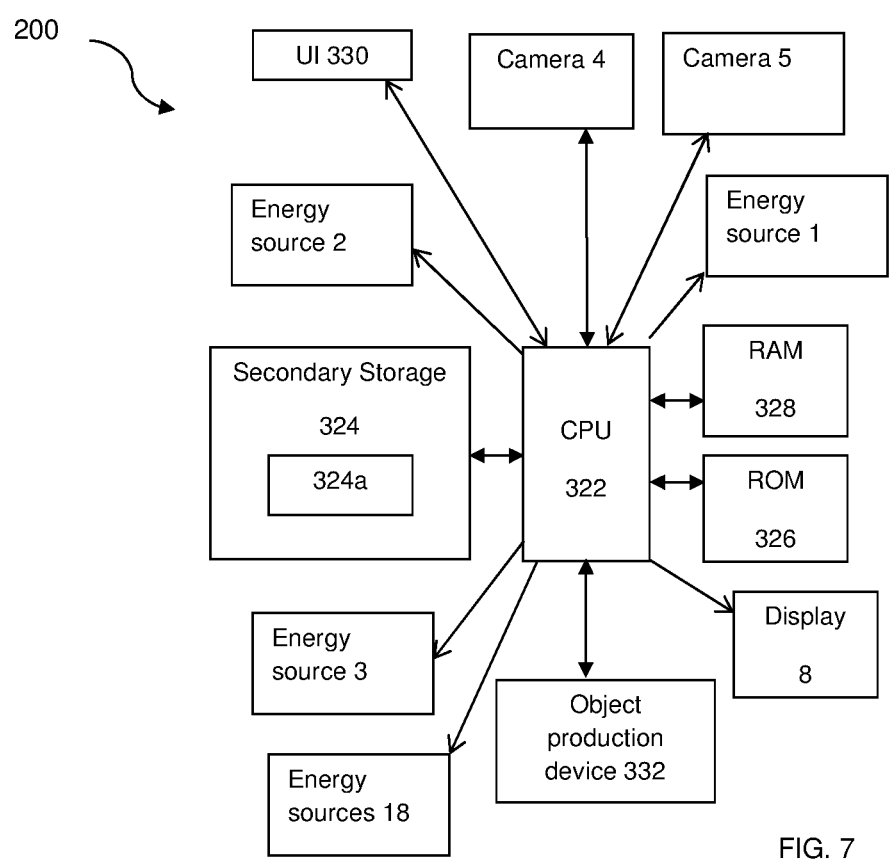
FIG. 7 illustrates an embodiment of the invention incorporating the imaging assembly of FIG. 1(a) and a processor.

FIG. 7 is a block diagram showing a technical architecture of the overall system 200 for performing the method.

The technical architecture includes a processor 322 (which may be referred to as a central processor unit or CPU) that is in communication with the cameras 4, 5, for controlling when they capture images and receiving the images. The processor 322 is further in communication with, and able to control the energy sources 1, 2, 3, 18, and the display 8.

The processor 322 is also in communication with memory devices including secondary storage 324 (such as disk drives or memory cards), read only memory (ROM) 326, random access memory (RAM) 328. The processor 322 may be implemented as one or more CPU chips.

The system 200 includes a user interface (UI) 330 for controlling the processor 322. The UI 330 may comprise a touch screen, keyboard, keypad or other known input device. If the UI 330 comprises a touch screen, the processor 322 is operative to generate an image on the touch screen. Alternatively, the system may include a separate screen (not shown) for displaying images under the control of the processor 322. Note that the UI 330 is separate from the display 8, since the UI 330 is typically used by an operator to control the system, whereas the display is for the subject to look at.

The system 200 optionally further includes a unit 332 for forming 3D objects designed by the processor 322; for example the unit 332 may take the form of a 3D printer. Alternatively, the system 200 may include a network interface for transmitting instructions for production of the objects to an external production device.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has an order generation component 324a, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. In one possibility the processor 322 may be provided as a FPGA (field-programmable gate array), configured after its manufacturing process, for use in the system of FIG. 7.

While only one processor 322 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope of the attached claims.

For example, there is no requirement for the first item of eyewear to be a set of dummy glasses. It may alternatively be an item of eyewear which the subject is accustomed to wearing and/or a set of vision correction glasses tailored to the subject.

In another example, whereas the method 50 includes steps 54 and 55 while the subject is wearing dummy glasses, alternatively steps equivalent to steps 51, 54, 55 and 56 may be performed at a time when the user is not wearing dummy glasses. This would result in eye models formed in the step corresponding to step 55. These eye models could be incorporated into the numerical face model by registering the skin model created in the step corresponding to step 56 with the skin model portion of the numerical face model created at a time when the user was wearing dummy glasses. An advantage of this variation is that since the eye models are formed using images captured when the subject is not wearing dummy glasses, the eye models may be more accurate.

The project leading to this application has received funding from the European Union's Horizon 2020 research and innovation programme under grant agreement No 710384.

The invention claimed is:

1. An imaging apparatus comprising:
   at least one energy source;
   an imaging assembly having at least one energy sensor arranged to capture at least one image of a face of a subject wearing an item of eyewear including one or more eyepieces; and
   a processor arranged to analyze the at least one image, by:
   (i) recognizing specular reflections in the at least one image from the one or more eyepieces;
   (ii) using the specular reflections to determine positions of the one or more eyepieces,
   (iii) generating a three-dimensional skin model of a portion of skin of the subject's face, and
   (iv) using the three-dimensional skin model and the positions of the one or more eyepieces to generate a numerical face model which indicates a position of the item of eyewear in relation to the three-dimensional skin model, the numerical face model having an eyewear portion derived from the positions of the one or more eyepieces.

2. An imaging apparatus according to claim 1 in which the processor is arranged to form the eyewear portion of the numerical face model using a pre-existing eyewear model of a shape of the item of eyewear.

3. An imaging apparatus according to claim 1 in which at least one of said at least one energy source is a directional energy source arranged to directionally illuminate the face of the subject in at least three directions,
 the processor being operative to obtain the three-dimensional skin model using photometry from images captured by the at least one energy sensor when the face of the subject is illuminated in the respective directions.

4. An imaging apparatus according claim 3 in which the processor is arranged to generate the three-dimensional skin model by:
 generating an initial three-dimensional model by stereoscopic reconstruction using optical triangulation; and
 refining the initial three-dimensional model using the photometry.

5. An imaging apparatus according to claim 1 in which the processor is arranged to generate the numerical face model including an eye portion representing one of the subject's eyes, the processor being arranged:
 (i) to recognize specular reflections in the at least one image from one or more eyes of the subject; and
 (ii) to use the specular reflections from the one or more eyes of the subject to form the eye portion of the numerical face model by a process including fitting the recognized specular reflections from the one or more eyes of the subject to numerical parameters of a pre-existing numerical eye model.

6. An imaging apparatus according to claim 5 in which the pre-existing numerical eye model includes a sclera portion which is at least a portion of a sphere.

7. An imaging apparatus according to claim 5 in which the processor is arranged to generate the eye portion of the numerical face model by a process which uses data describing specular reflections from the eye compensated for expected refraction of light rays causing the specular reflections from the eye, due to passage of the light rays through the item of eyewear.

8. An imaging apparatus according to claim 1 in which the processor is operative to modify, based on the numerical face model, at least one parameter of a model of a second item of eyewear, and to transmit instructions to cause the second item of eyewear to be fabricated according to the modified parameter.

9. An imaging apparatus according to claim 8 in which the processor is operative to determine a numerical measure of a field of view of the subject when wearing the fabricated second item of eyewear.

10. A computer-implemented method for obtaining information about a subject who is wearing an item of eyewear including one or more eyepieces, the method comprising:
 (a) illuminating a face of the subject using at least one energy source;
 (b) capturing one or more images of the face of the subject; and
 (c) analyzing the one or more images, by:
  (i) recognizing specular reflections in the one or more images from the one or more eyepieces;
  (ii) using the specular reflections from the one or more eyepieces to find positions of the one or more eyepieces,
  (iii) generating a three-dimensional skin model of a portion of skin of the subject's face, and
  (iv) using the three-dimensional skin model and the positions of the one or more eyepieces to generate a numerical face model which indicates a position of the item of eyewear in relation to the three-dimensional skin model, the numerical face model having an eyewear portion derived from the positions of the one or more eyepieces.

11. A method according to claim 10 in which the eyewear portion of the numerical face model is formed using a pre-existing eyewear model of a shape of the item of eyewear.

12. A method according to claim 10 in which the face of the subject is illuminated in at least three directions,
 the processor being operative to obtain the three-dimensional skin model using photometry from images captured by the at least one energy sensor when the face of the subject is illuminated in the respective directions.

13. A method according claim 12 in which the three-dimensional skin model is generated by:
 generating an initial three-dimensional model by stereoscopic reconstruction using optical triangulation; and
 refining the initial three-dimensional model using the photometry.

14. A method according to claim 13 in which the numerical face model includes an eye portion representing at least one of the subject's eyes, being formed by the eye portion of the numerical face model being formed by:
 (i) recognizing specular reflections in the one or more images from one or more eyes of the subject; and
 (ii) using the specular reflections from the one or more eyes of the subject to form the eye portion of the numerical face model by fitting the recognized specular reflections from the one or more eyes of the subject to numerical parameters of a pre-existing numerical eye model.

15. A method according to claim 14 in which the pre-existing numerical eye model includes a sclera portion which is at least a portion of a sphere.

16. A method according to claim 10 in which an eye portion of the numerical face model is formed by a process which uses data describing specular reflections from an eye compensated for expected refraction of light rays causing the specular reflections from the eye, due to passage of the light rays through the item of eyewear.

17. A method according to claim 10 comprising, based on the numerical face model, modifying at least one parameter of a model of a second item of eyewear, and transmitting instructions to cause the second item of eyewear to be fabricated according to the modified parameter.

18. A method according to claim 17 comprising determining a numerical measure of a field of view of the subject when wearing the fabricated second item of eyewear.

19. A method according to claim 17 further comprising fabricating the second item of eyewear according to the at least one parameter.

20. A method according to claim 17 in which the second item of eyewear is a pair of glasses including reflective lenses.

* * * * *